United States Patent
Kubitza et al.

(10) Patent No.: US 12,515,582 B2
(45) Date of Patent: Jan. 6, 2026

(54) METHOD FOR CONTROLLING A VEHICLE HEADLAMP

(71) Applicant: HELLA GmbH & Co. KGaA, Lippstadt (DE)

(72) Inventors: Boris Kubitza, Moehnesee-Koerbecke (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 147 days.

(21) Appl. No.: 18/380,366

(22) Filed: Oct. 16, 2023

(65) Prior Publication Data

US 2024/0123896 A1    Apr. 18, 2024

(51) Int. Cl.
*B60Q 1/14*    (2006.01)

(52) U.S. Cl.
CPC ........ *B60Q 1/143* (2013.01); *B60Q 2300/112* (2013.01); *B60Q 2300/322* (2013.01); *B60Q 2300/42* (2013.01)

(58) Field of Classification Search
CPC .............. B60Q 1/143; B60Q 2300/112; B60Q 2300/322; B60Q 2300/42; B60Q 1/076; B60Q 1/122; B60Q 1/1415
See application file for complete search history.

(56) References Cited

U.S. PATENT DOCUMENTS

| | | | |
|---|---|---|---|
| 8,157,427 B2 | 4/2012 | Mochizuki et al. | |
| 9,114,755 B2* | 8/2015 | Huster | B60Q 1/143 |
| 9,227,553 B2 | 1/2016 | Nordbruch | |
| 9,764,683 B2 | 9/2017 | Illium et al. | |
| 11,400,857 B2 | 8/2022 | Arndt et al. | |
| 2013/0049587 A1* | 2/2013 | Nakadate | B60Q 1/143 315/82 |
| 2020/0241378 A1* | 7/2020 | Wei | G02F 1/163 |
| 2023/0100739 A1* | 3/2023 | Doerne | G08G 1/166 315/82 |

FOREIGN PATENT DOCUMENTS

| | | |
|---|---|---|
| DE | 102005033841 A1 | 12/2006 |
| DE | 102015011623 A1 | 3/2017 |
| DE | 102017001893 A1 | 8/2018 |
| DE | 102010040650 B4 | 8/2020 |
| DE | 102020120713 A1 | 2/2022 |
| EP | 2100769 A2 | 9/2009 |

* cited by examiner

*Primary Examiner* — Abdullah A Riyami
*Assistant Examiner* — Syed M Kaiser
(74) *Attorney, Agent, or Firm* — Muncy, Geissler, Olds & Lowe, P.C.

(57) ABSTRACT

A method for controlling a headlamp of a first motor vehicle traveling on a roadway, the method including: operation of the headlamp with a high beam light distribution, wherein at least a part of the high beam light distribution covers the roadway; sensing of an environment in front of the first motor vehicle with a camera; detection of a curve in the roadway located in front of the first motor vehicle; determination of whether a second vehicle traveling on the curve can be sensed by the camera; and reduction of a width of the high beam light distribution when it has been determined that the second motor vehicle cannot be sensed.

13 Claims, 1 Drawing Sheet

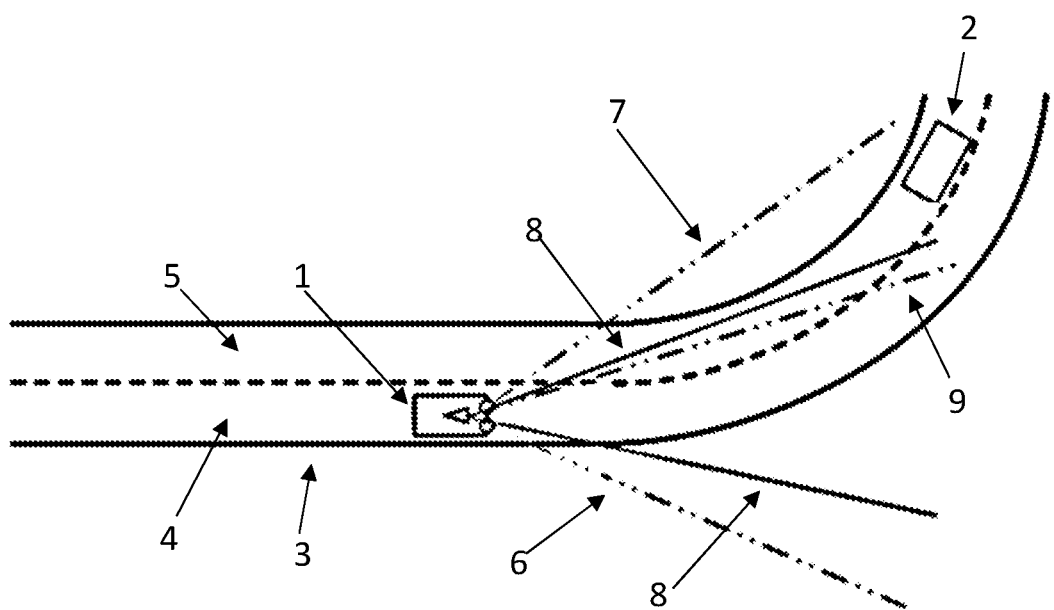

METHOD FOR CONTROLLING A VEHICLE HEADLAMP

This nonprovisional application claims priority under 35 U.S.C. § 119(a) to German Patent Application No. 10 2022 127 073.4, which was filed in Germany on Oct. 17, 2022, and which is herein incorporated by reference.

BACKGROUND OF THE INVENTION

Field of the Invention

The present invention relates to a method for controlling a headlamp of a first motor vehicle traveling on a roadway.

Description of the Background Art

From DE 10 2017 001 893 A1, a method is known for controlling a headlight system for a vehicle having at least one LED pixel headlamp for producing at least one row of high beam segments, wherein the headlight system can be driven in at least two control modes, each having an associated selectable maximum basic high beam width of the at least one row of high beam segments.

SUMMARY OF THE INVENTION

It is therefore an object of the present invention to provide an improved illumination of the roadway in comparison with the conventional art.

In an exemplary embodiment, the method comprises the operation of the headlamp with a high beam light distribution. At least a part of the high beam light distribution covers the roadway in this case. A high beam light distribution can be understood within the scope of this specification to mean, for example, a light distribution that covers a larger area of the roadway than the low beam and also, in particular, illuminates the environment higher and further. The high beam light distribution can also be referred to as a full beam light distribution.

A disadvantage of high beam light distribution is a dazzling of other road users as soon as they are located inside the high beam light distribution.

An environment in front of the motor vehicle is sensed with a camera. This sensing can serve, for example, to set the high beam light distribution darker in areas where other road users are located.

In addition, a curve of the roadway located in front of the motor vehicle is detected. This can also be accomplished using images recorded by the camera, for example. After that, it is determined whether a second vehicle traveling on the curve can be sensed by the camera. The sensing ability can be impaired by the curvature of the curve, for example. What is important in this context is that only the sensing ability is determined. In other words, it is not strictly necessary for an actual, second motor vehicle to be present. It could also be a matter of a hypothetical, second motor vehicle.

When it has been determined that the second motor vehicle cannot be sensed, the width of the high beam light distribution is reduced. The width is understood within the scope of this specification to mean, in particular, a horizontal dimension that is perpendicular to the longitudinal axis of the motor vehicle. In this context, the longitudinal axis extends in the direction in which the motor vehicle is intended to travel with no steering angle. The reduction of the width can be achieved, for example, by reducing a beam angle of the headlamp. The beam angle in this case is the angle between a geometric line that bounds the high beam light distribution and the longitudinal axis of the motor vehicle. The geometric line in this case is merely virtual and is not present in reality.

Through the reduction of the width, a portion of the curve can be excluded from the high beam light distribution so that the second motor vehicle is not dazzled by the high beam light distribution even though it was not recognized by the camera. Moreover, an unnecessary reduction of the width is avoided because of the condition for the reduction of the width. When the first motor vehicle approaches a curve in which other motor vehicles traveling on the curve can be sensed by the camera, the width is not reduced. Then, as soon as one of the other motor vehicles has been sensed, it can be excluded from the high beam light distribution at that time.

The width can be reduced in that a part of the high beam light distribution in an inner region of the curve is excluded from the high beam light distribution. Often, this inner region is the region where the second motor vehicle that cannot be sensed is traveling. The probability for a dazzling of the driver of the second motor vehicle can thus be reduced in this way.

A speed of the first motor vehicle, a curvature of the curve, and/or a distance of the first motor vehicle from the curve can be used in the determination. These parameters are critical in determining whether the second motor vehicle can be sensed. The curvature of the curve, in particular, is an important parameter here.

The speed of the first motor vehicle, the curvature of the curve, and/or the distance of the first motor vehicle from the curve can be determined from images recorded by the camera. For example, the curvature of the curve can be determined from data from a lane keeping assistance system. Alternatively or in addition, the speed of the first motor vehicle, the curvature of the curve, and/or the distance of the first motor vehicle from the curve can be determined from data from a satellite navigation system in combination with map data. A satellite navigation system can be, for example, the Global Positioning System, Galileo, Beidou, or GLONASS. Within the scope of this specification, map data can be, in particular, data that are, for example, used by a navigation system of the automobile in combination with the data from the satellite navigation system to determine the position of the first motor vehicle on the roadway and, under certain circumstances, to determine a planned route of the motor vehicle.

A probability that the second motor vehicle cannot be sensed by the camera can be calculated during the determination of whether the second vehicle traveling on the curve can be sensed by the camera. The reduction of the width of the high beam light distribution is then carried out only if the probability is above a probability threshold value.

The roadway can include a first lane and a second lane. The first motor vehicle can travel in the first lane and the second motor vehicle in the second lane.

The first motor vehicle can be traveling toward the second motor vehicle, and the second motor vehicle toward the first motor vehicle.

The high beam light distribution can be produced by a headlamp system having multiple headlamps. The headlamp can be one of the headlamps in this case. It is possible, in particular, that all headlamps of the headlamp system are controlled as described above with reference to the headlamp.

The method can include a detection of whether a third motor vehicle that is covered by the high beam light distribution is in the environment. This can, for example, be accomplished independently of the curve and of the second motor vehicle. In addition, a light intensity emitted by the headlamp toward the third motor vehicle can be set below a light threshold. In this way, the risk of dazzling the driver of the third motor vehicle can be reduced.

The reduction of the width can be carried out only when it has been determined that the second motor vehicle cannot be sensed. Thus a reduction in the width does not take place before every curve, and does not take place when the second motor vehicle can be sensed. In this way, unnecessary reductions in width are avoided.

A curvature of the roadway can be determined during the detection of the curve. The reduction of the width of the high beam light distribution can then also be carried out when a determination of the curvature is not possible.

Provided also is a system that includes a control unit for a headlamp of a motor vehicle and the headlamp. The control unit in this case is designed to carry out a method according to an embodiment of the invention.

Further, provided is a motor vehicle that includes a system according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE shows a schematic top view of a roadway with two motor vehicles traveling thereon.

DETAILED DESCRIPTION

A first motor vehicle 1 is driving on a first lane 4 of a roadway 3. A second motor vehicle 2 is driving on a second lane 5 of the roadway 3. The first motor vehicle 1 is driving toward the second motor vehicle 2 here. The second motor vehicle 2 is driving toward the first motor vehicle 1. The roadway 3 has a curve. While the first motor vehicle 1 is still located in a straight section of the roadway 3 and is traveling toward the curve, the second motor vehicle 2 is located on the curve.

The first motor vehicle 1 includes headlamps that emit a high beam light distribution that illuminates a section of the roadway 3 in front of the first motor vehicle 1. Boundaries of this high beam light distribution are marked with the lines 6 and 7 in the FIGURE. In addition, the first motor vehicle 1 includes a camera that is designed to sense other motor vehicles in a sensing range in front of the first motor vehicle 1. Boundaries of the sensing range are marked with the lines 8 in the FIGURE. When another motor vehicle is sensed in the sensing range, the light intensity emitted toward the other motor vehicle can be reduced. In this way, the risk of dazzling the driver of the other motor vehicle can be reduced.

On account of the curvature of the curve, the second motor vehicle 2 is located outside the sensing range. This depends upon the curvature of the curve and on the distance of the first motor vehicle 1 from the curve. According to the invention, provision is made that the width of the high beam light distribution is reduced when the second motor vehicle 2 in the curve cannot be sensed by the camera. The width is reduced by the means that a part of the high beam light distribution in an inner region of the curve is excluded from the high beam light distribution. In the FIGURE, the lines with reference symbols 6 and 9 identify the boundaries of the high beam light distribution with reduced width. It should be noted here that after the reduction in the width, the sensing range of the camera covers a larger part of the second lane 5 than the high beam light distribution. Consequently, this risk of dazzling the driver of the second motor vehicle 2 is reduced by the reduction of the width of the high beam light distribution when the second motor vehicle 2 is traveling outside the sensing range.

It is especially advantageous that the width of the high beam light distribution is reduced when it is determined that the second motor vehicle 2 cannot be sensed, for example on account of the curvature of the curve. The reason is that the risk of dazzling the driver of the second motor vehicle 2 is reduced in this case even when the second motor vehicle 2 is not sensed.

Preferably, the width of the high beam light distribution is reduced only when it is determined that the second motor vehicle 2 cannot be sensed. Consequently, a reduction in the width does not take place solely for the reason that a curve is detected in front of the first motor vehicle 1. It is possible that a necessary condition for the reduction of the width is the determination that the second motor vehicle 2 cannot be sensed.

The curve can be detected, for example, by the means that data from a driver assistance system, for example from a lane keeping assistance system, are used. Consequently, the images recorded by the camera can also be used for detection of the curve. The curvature of the curve, the position of the first motor vehicle 1, the distance of the first motor vehicle 1 from the curve, and the speed of the first motor vehicle 1 can be used as parameters for the determination of whether the second vehicle 2 traveling on the curve can be sensed. A single, some, or all of these parameters can be determined from driver assistance systems and/or with the use of a satellite navigation system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to control a headlamp of a first motor vehicle traveling on a roadway, the method comprising:
    operating the headlamp with a high beam light distribution, at least a part of the high beam light distribution covering the roadway;
    sensing an environment in front of the first motor vehicle with a camera;
    detecting a curve in the roadway located in front of the first motor vehicle;
    determining whether a second vehicle traveling on the curve is sensed by the camera; and reducing a width of the high beam light distribution when it has been determined that the second motor vehicle cannot be sensed.

2. The method according to claim 1, wherein the width is reduced in that a part of the high beam light distribution in an inner region of the curve is excluded from the high beam light distribution.

3. The method according to claim 1, wherein a speed of the first motor vehicle, a curvature of the curve, and/or a distance of the first motor vehicle from the curve is used in the determination.

4. The method according to claim 3, wherein the speed of the first motor vehicle, the curvature of the curve, and/or the distance of the first motor vehicle from the curve is determined from images recorded by the camera and/or from data from a satellite navigation system in combination with map data.

5. The method according to claim 1, wherein a probability that the second motor vehicle cannot be sensed by the camera is calculated during the determination of whether the second vehicle traveling on the curve can be sensed by the camera, and wherein the reduction of the width of the high beam light distribution is carried out only when the probability is above a probability threshold value.

6. The method according to claim 1, wherein the roadway includes a first lane and a second lane, wherein the first motor vehicle travels in the first lane and the second motor vehicle travels in the second lane.

7. The method according to claim 1, wherein the first motor vehicle is traveling towards the second motor vehicle, and the second motor vehicle is traveling towards the first motor vehicle.

8. The method according to claim 1, wherein the high beam light distribution is produced by a headlamp system having multiple headlamps, and wherein the headlamp is a component of the headlamp system.

9. The method according to claim 1, further comprising:
    detecting whether a third motor vehicle that is covered by the high beam light distribution is in the environment; and
    setting a light intensity emitted by the headlamp toward the third motor vehicle below a light threshold.

10. The method according to claim 1, wherein the reduction of the width is carried out only when it has been determined that the second motor vehicle cannot be sensed.

11. The method according to claim 1, wherein a curvature of the roadway is determined during the detection of the curve, and wherein the reduction of the width of the high beam light distribution is also carried out when a determination of the curvature is not possible.

12. A system comprising:
    a control unit, the control unit being designed to carry out the method according to claim 1; and
    the headlamp of the first motor vehicle that is controlled by the control unit.

13. The first motor vehicle comprising the system according to claim 12.

* * * * *